(12) United States Patent
Chen et al.

(10) Patent No.: US 7,215,466 B2
(45) Date of Patent: May 8, 2007

(54) OPTICAL FILTER FOR SCREENING OUT INFRARED AND ULTRAVIOLET LIGHT

(75) Inventors: Ga-Lane Chen, Fullerton, CA (US); Ching-Chou Chang, Tu-Cheng (TW)

(73) Assignee: Hon Hai Precision Industry Co. Ltd, Taipei Hsien (TW)

( * ) Notice: Subject to any disclaimer, the term of this patent is extended or adjusted under 35 U.S.C. 154(b) by 0 days.

(21) Appl. No.: 11/433,137

(22) Filed: May 12, 2006

(65) Prior Publication Data

US 2007/0002433 A1    Jan. 4, 2007

(30) Foreign Application Priority Data

Jul. 1, 2005 (TW) ................. 094122299

(51) Int. Cl.
*F21V 9/06* (2006.01)
*G02B 7/10* (2006.01)

(52) U.S. Cl. ............. 359/359; 359/350; 359/588; 359/587

(58) Field of Classification Search ........ 359/350–361, 359/557–590
See application file for complete search history.

(56) References Cited

U.S. PATENT DOCUMENTS

| | | | | |
|---|---|---|---|---|
| 2,444,976 A | | 7/1948 | Brown | 359/361 |
| 4,229,066 A | * | 10/1980 | Rancourt et al. | 359/359 |
| 5,274,661 A | * | 12/1993 | von Gunten et al. | 372/99 |
| 5,360,659 A | * | 11/1994 | Arends et al. | 428/216 |
| 5,926,317 A | * | 7/1999 | Cushing | 359/588 |
| 5,982,078 A | * | 11/1999 | Krisl et al. | 313/112 |
| 6,611,378 B1 | * | 8/2003 | Wang et al. | 359/588 |
| 6,631,033 B1 | * | 10/2003 | Lewis | 359/584 |
| 6,927,900 B2 | * | 8/2005 | Liu et al. | 359/359 |

* cited by examiner

*Primary Examiner*—Thong Q Nguyen
(74) *Attorney, Agent, or Firm*—Jeffrey T. Knapp

(57) ABSTRACT

An optical filter for screening out infrared and ultraviolet light includes a transparent substrate and a film stack formed on the substrate. The film stack includes a number of high refractive index layers and a number of low refractive index layers alternately stacked one on another. The film stack is represented as follows: $(3.5H3.5L)^7(2.5H2.5L)^7(HL)^6(0.76H0.76L)^6$, wherein, H represents a high refractive index layer having a base optical thickness equal to one fourth of a reference wavelength associated with the optical filter, L represents a low refractive index layer having a base optical thickness equal to one fourth of a reference wavelength associated with the optical filter, expressions enclosed in each parenthesis represent filter cavities, and superscripts represents the number of repetitions of the expression enclosed in that parenthesis.

11 Claims, 2 Drawing Sheets

OPTICAL FILTER FOR SCREENING OUT INFRARED AND ULTRAVIOLET LIGHT

TECHNICAL FIELD

The present invention generally relates to optical filters, and more particularly to an optical filter which can screen out infrared and ultraviolet rays while permitting visible light to transmit therethrough.

BACKGROUND

Glass used in windshields, windows and other openings of aircraft or automobiles not only has the function of protecting pilots and crew from outside airflow but also acts to screen out injurious solar rays and exclude solar heat from the interior of the vehicle.

The harmful rays contained in the solar radiation are mainly in the ultraviolet (UV) and infrared (IR) spectrum. A conventional optical filter for screening out both ultraviolet and infrared rays is composed of ultraviolet absorption glass coupled with infrared absorption glass. The ultraviolet absorption glass is produced by adding a certain of ultraviolet cut-off material into an ordinary glass to render the ultraviolet absorption glass capable of screening out the ultraviolet rays. The ultraviolet cut-off material is mainly composed of cerium hydrate and titanium oxide. The infrared absorption glass is produced by adding an amount of infrared cut-off material to an ordinary glass to render the infrared absorption glass capable of screening out the infrared radiation. The infrared cut-off material includes iron oxide or a compound containing iron oxide. In this conventional optical filter, the UV and IR radiations are screened out by the absorption agent, so a filtering quality of the optical filter is greatly limited. In addition, the conventional optical filter is made of two pieces of absorption glasses, thus rendering a complexity in structure.

Therefore, it is desired to provide an improved optical filter that overcomes the above-described problems.

SUMMARY

An optical filter for screening out infrared and ultraviolet light includes a transparent substrate and a film stack formed on the substrate. The film stack includes a number of high refractive index layers and a number of low refractive index layers alternately stacked one on another. The film stack is represented as follows: $(3.5H3.5L)^7(2.5H2.5L)^7(HL)^6(0.76H0.76L)^6$, wherein H represents a high refractive index layer having a base optical thickness equal to one fourth of a reference wavelength associated with the optical filter, L represents a low refractive index layer having a base optical thickness equal to one fourth of the reference wavelength associated with the optical filter, the expression enclosed in each parenthesis represents a filter cavity, and the superscript represents the number of repetition of the expression enclosed in that parenthesis.

Advantages and novel features will become more apparent from the following detailed description when taken in conjunction with the accompanying drawings.

BRIEF DESCRIPTION OF THE DRAWINGS

Many aspects of the present optical filter can be better understood with reference to the following drawings. The components in the drawings are not necessarily drawn to scale, the emphasis instead being placed upon clearly illustrating the principles of the present optical filter. Moreover, in the drawings, like reference numerals designate corresponding parts throughout the several views.

DETAILED DESCRIPTION OF PREFERRED EMBODIMENTS

Figures 1, 2:
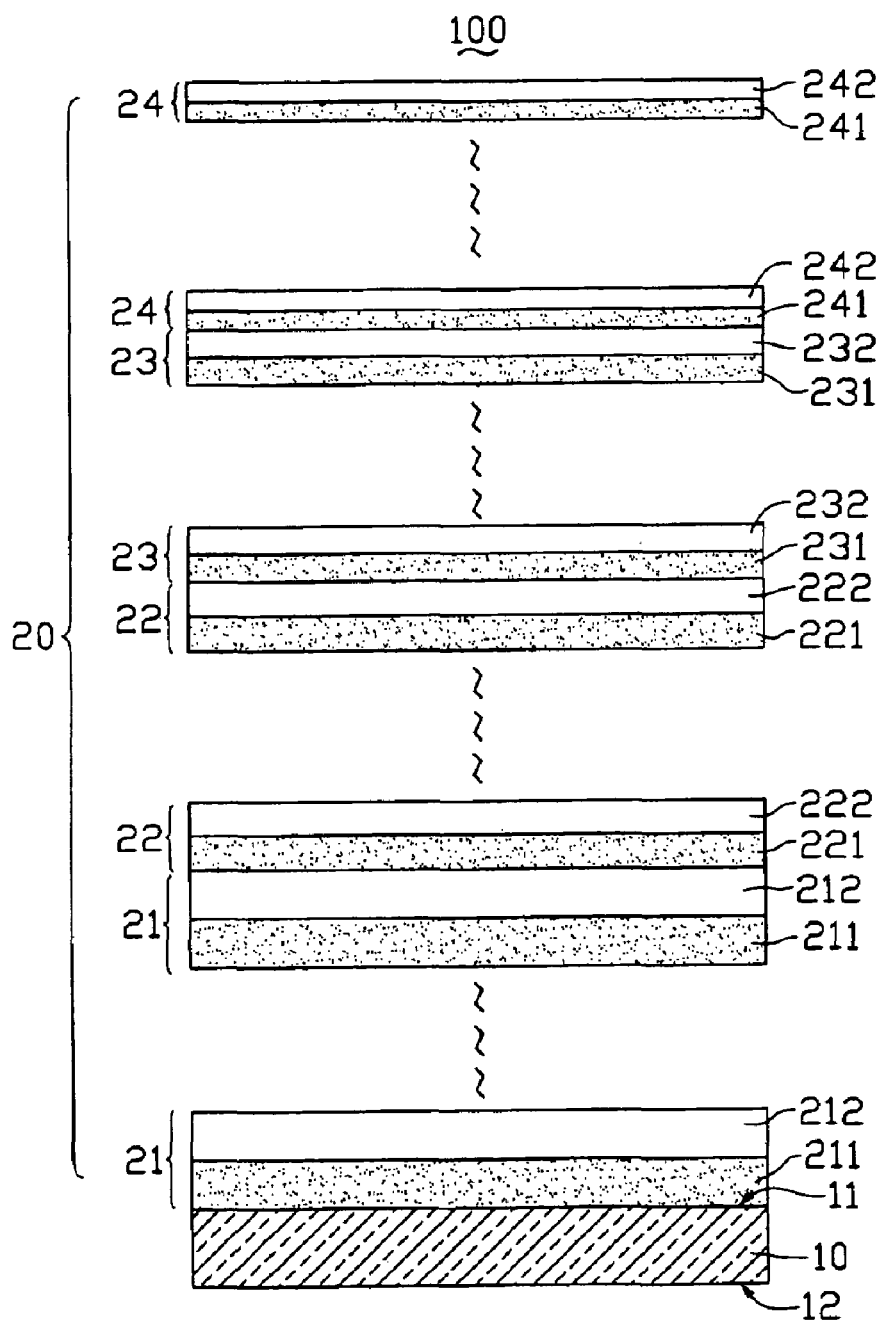
FIG. 1 is a schematic, cross-sectional view of an optical filter for screening out infrared and ultraviolet radiations, in accordance with a first embodiment.
FIG. 2 is a schematic, exploded view of a substrate and a film stack of the optical filter of FIG. 1.

Referring to FIG. 1, an optical filter 100 for screening out ultraviolet and infrared radiation according to a first embodiment is shown. The optical filter 100 can be used in the windshields, windows and other openings of aircraft or automobiles. The optical filter 100 includes a transparent substrate 10 and a film stack 20. In this embodiment, being a window of an aircraft, the transparent substrate 10 has a first surface 11 and a second surface 12. The film stack 20 is formed on either first surface 11 or outer surface 11. In this embodiment, the film stack 20 is formed on the first surface 11 of the transparent substrate 10. The transparent substrate 10 can be made of glass, ceramic, or plastic.

Referring to FIG. 2, the film stack 20 may be represented as follows: $(3.5H3.5L)^7(2.5H2.5L)^7(HL)^6(0.76H0.76L)^6$, wherein H represents a high refractive index layer having a base optical thickness equal to one fourth of a reference wavelength λ associated with the optical filter, L represents a low refractive index layer having a base optical thickness equal to one fourth of the reference wavelength λ associated with the optical filter, expressions enclosed in each parenthesis represent filter cavities, and superscripts represent the number of repetitions of the expression enclosed in the parenthesis so indicated.

In the film stack 20, (3.5H3.5L) represents a first filter cavity 21 consisting of a high refractive index layer 211 and a low refractive index layer 212, (2.5H2.5L) represents a second filter cavity 22 consisting of a high refractive index layer 221 and a low refractive index layer 222, (HL) represents a third filter cavity 23 consisting of a high refractive index layer 231 and a low refractive index layer 232, and (0.76H0.76L) represents a fourth filter cavity 24 consisting of a high refractive index layer 241 and a low refractive index layer 242. The film stack 20 includes seven first filter cavities 21, seven second filter cavities 22, six third filter cavities 23 and six fourth filter cavities 24.

In the first filter cavity 21, the high and low refractive index layers 211, 212 both have an optical thickness equal to $3.5 \times (\lambda/4)$. In the second filter cavity 22, the high and low refractive index layers 221, 222 both have an optical thickness equal to $2.5 \times (\lambda/4)$. In the third filter cavity 23, the high and low refractive index layers 231, 232 both have an optical thickness equal to $1 \times (\lambda/4)$. In the fourth filter cavity 24, the high and low refractive index layers 241, 242 both have an optical thickness equal to $0.76 \times (\lambda/4)$. If refractive index of the high refractive index layers 211, 221, 231, 241 is represented by $n_H$, then physical thickness of the high refractive index layers 211, 221, 231, 241 is equal to $(3.5 \times (\lambda/4))/n_H$, $(2.5 \times (\lambda/4))/n_H$, $(1 \times (\lambda/4))/n_H$, $(0.76 \times (\lambda/4))/n_H$, respectively. If refractive index of the low refractive index layers 212, 222, 232, 242 is represented by $n_L$, then physical thickness of the low refractive index layers 212,

222, 232, 242 is equal to $(3.5\times(\lambda/4))/n_L$, $(2.5\times(\lambda/4))/n_L$, $(1\times(\lambda/4))/n_L$, $(0.76\times(\lambda/4))/n_L$, respectively.

In the film stack 20, the high refractive index layers 211, 221, 231, 241 are made of a material selected from the group consisting of titanium dioxide ($TiO_2$), titanium pentoxide ($TiO_5$) and tantalum pentoxide ($Ta_2O_5$). The low refractive index layers 212, 222, 232, 242 are made of a material selected from the group consisting of silicon dioxide ($SiO_2$) and aluminum oxide ($Al_2O_3$). For example, when the high refractive index layers 211, 221, 231, 241 are made of $TiO_2$, the reflective index $n_H$ is equal to 2.311. If low refractive index layers 212, 222, 232, 242 are made of $SiO_2$, the reflective index $n_L$ is equal to 1.473. Because the wavelength of the ultraviolet light is in the range from 200 to 400 nanometers and that of the infrared light is in the range from 747 to 840 nanometers, a value of $\lambda$ for the film stack 20 is determined. Accordingly, the numerical values of H and L are also determined. A thickness of each layer of the film stack 20 is shown in Table 1-1. The layers are numbered from an innermost layer attached to the first surface 11 of the transparent substrate 10 to an outermost layer outwardly exposed.

TABLE 1-1

| Number of layer | Thickness |
|---|---|
| 1 | 3.5H |
| 2 | 3.5L |
| 3 | 3.5H |
| 4 | 3.5L |
| 5 | 3.5H |
| 6 | 3.5L |
| 7 | 3.5H |
| 8 | 3.5L |
| 9 | 3.5H |
| 10 | 3.5L |
| 11 | 3.5H |
| 12 | 3.5L |
| 13 | 3.5H |
| 14 | 3.5L |
| 15 | 2.5H |
| 16 | 2.5L |
| 17 | 2.5H |
| 18 | 2.5L |
| 19 | 2.5H |
| 20 | 2.5L |
| 21 | 2.5H |
| 22 | 2.5L |
| 23 | 2.5H |
| 24 | 2.5L |
| 25 | 2.5H |
| 26 | 2.5L |
| 27 | 2.5H |
| 28 | 2.5L |
| 29 | H |
| 30 | L |
| 31 | H |
| 32 | L |
| 33 | H |
| 34 | L |
| 35 | H |
| 36 | L |
| 37 | H |
| 38 | L |
| 39 | H |
| 40 | L |
| 41 | 0.76H |
| 42 | 0.76L |
| 43 | 0.76H |
| 44 | 0.76L |
| 45 | 0.76H |
| 46 | 0.76L |
| 47 | 0.76H |
| 48 | 0.76L |
| 49 | 0.76H |
| 50 | 0.76L |
| 51 | 0.76H |
| 52 | 0.76L |

The thickness of the film stack 20 in Table 1-1 may be further optimized. According to a predetermined visible light transmission, such as ninety-five percent of the visible light transmission, a group of optimized thickness values for substantially screening out the ultraviolet and infrared light can be obtained. The optimized thickness of each layer of the film stack 20 is shown in Table 1-2. The layers are numbered from an innermost layer connecting with the first surface 11 of the transparent substrate 10 to an outermost layer outwardly exposed.

TABLE 1-2

| Number of layer | Optimized thickness |
|---|---|
| 1 | 3.409H |
| 2 | 3.214L |
| 3 | 3.628H |
| 4 | 3.342L |
| 5 | 3.721H |
| 6 | 3.298L |
| 7 | 3.608H |
| 8 | 3.259L |
| 9 | 3.348H |
| 10 | 2.994L |
| 11 | 3.169H |
| 12 | 3.066L |
| 13 | 3.355H |
| 14 | 2.904L |
| 15 | 2.804H |
| 16 | 2.631L |
| 17 | 2.665H |
| 18 | 2.480L |
| 19 | 2.593H |
| 20 | 2.492L |
| 21 | 2.540H |
| 22 | 2.490L |
| 23 | 2.519H |
| 24 | 2.472L |
| 25 | 2.593H |
| 26 | 2.520L |
| 27 | 2.729H |
| 28 | 2.982L |
| 29 | 0.799H |
| 30 | 0.668L |
| 31 | 0.931H |
| 32 | 0.950L |
| 33 | 0.969H |
| 34 | 0.919L |
| 35 | 0.998H |
| 36 | 1.185L |
| 37 | 0.990H |
| 38 | 0.813L |
| 39 | 0.844H |
| 40 | 0.665L |
| 41 | 0.789H |
| 42 | 0.690L |
| 43 | 0.936H |
| 44 | 0.643L |
| 45 | 0.584H |
| 46 | 0.676L |
| 47 | 0.663H |
| 48 | 0.733L |
| 49 | 1.004H |
| 50 | 0.594L |
| 51 | 0.246H |
| 52 | 1.221L |

In the optimized film stack 20, the values of H and L are not changed, but the coefficients of H and L are changed to optimize a performance of the film stack 20. As shown in Table 1-2, the film stack 20 can be represented as follows: $(a_1Ha_2L)^7(b_1Hb_2L)^7(c_1Hc_2L)^6(d_1Hd_2L)^6$, wherein $a_1$ is in the range from 3.169 to 3.721, $a_2$ is in the range from 2.904 to 3.342, $b_1$ is in the range from 2.519 to 2.804, $b_2$ is in the range from 2.472 to 2.982, $c_1$ is in the range from 0.799 to 0.998, $c_2$ is in the range from 0.665 to 1.185, $d_1$ is in the range from 0.246 to 1.004, $d_2$ is in the range from 0.594 to 1.221.

Figure 3:
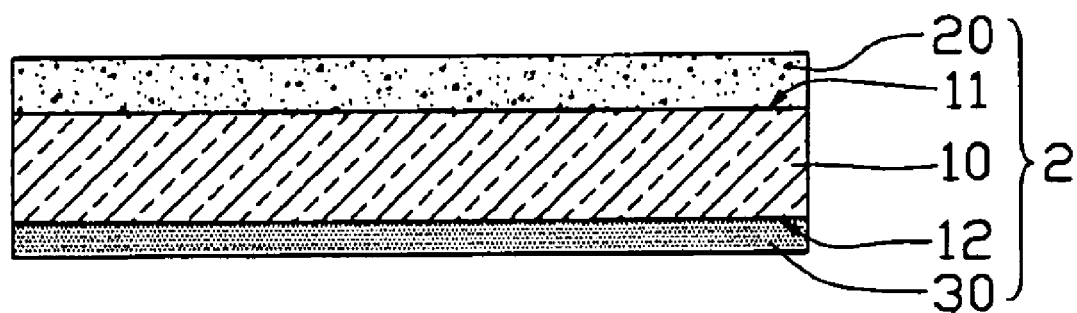
FIG. 3 is a schematic, cross-sectional view of an optical filter for screening out infrared and ultraviolet light, in accordance with a second embodiment.

Referring to FIG. 3, an optical filter 200 for screening out ultraviolet and infrared radiation according to a second embodiment is shown. The optical filter 200 includes a transparent substrate 10, a film stack 20 and an anti-reflective film 30. The transparent substrate 10 has a first surface 11 and a second surface 12 on an opposite side. The film stack 20 is configured on the first surface 11, and the anti-reflective film 30 is configured on the second surface 12.

Alternatively, the anti-reflective film 30 may be formed on the film stack 20, or may be formed between the transparent substrate 10 and the film stack 20. The anti-reflective film 30 is made of a material similar to that of the film stack 20, but the structure of the anti-reflective film 30 is different to that of the film stack 20. The anti-reflective film 30 has four layers, i.e. a first high refractive index film, a first low refractive index film, a second high refractive index film and a second low refractive index film successively stacked on the transparent substrate 10. Optical thicknesses of the high and low refractive index layers of the anti-reflective film 30 are both equal to those of the high and low refractive index layers of the film stack 20. If the coefficients of the first and second high refractive index layers are 0.301 and 2.546 respectively, then the optical thicknesses of the first and second high refractive index layers will be equal to $0.301 \times (\lambda/4)$ nanometers, $2.546 \times (\lambda/4)$ nanometers respectively. When the coefficients of the first and second low refractive index layers are 0.421 and 1.137 respectively, then the optical thicknesses of the first and second low refractive index layers will be equal to $0.421 \times (\lambda/4)$ nanometers, $1.137 \times (\lambda/4)$ nanometers respectively. The first and second high refractive index layers are made of $Ti_3O_5$, and the first and second low refractive index layers are made of $SiO_2$.

The present optical filter is capable not only of screening out the ultraviolet radiation but also the infrared radiation, and can be used for windows of automobiles and airplanes to benefit drivers and passengers alike. The present multilayer structure of the optical filter is capable of excellent filtering efficiency In addition, by further adding an anti-reflective film for preventing the visible light from being reflected by the base on the optical filter, the visible light transmission of the optical filter can be greatly increased.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical filter for screening out infrared and ultraviolet light, comprising:
   a transparent substrate, a film stack formed on the substrate, the film stack comprising a plurality of high refractive index layers and a plurality of low refractive index layers alternately stacked one on another, wherein the film stack is represented as follows: $(3.5H3.5L)^7(2.5H2.5L)^7(HL)^6(0.76H0.76L)^6$ wherein H represents a high refractive index layer having a base optical thickness equal to one fourth of a reference wavelength associated with the optical filter, L represents a low refractive index layer having a base optical thickness equal to one fourth of said reference wavelength associated with the optical filter, the expression enclosed in each parenthesis represents a filter cavity, and the superscript represents the number of repetition of the expression enclosed in that parenthesis.

2. The optical filter as claimed in claim 1, wherein the high refractive index layer is made of a material selected from the group consisting of titanium dioxide ($TiO_2$), titanium pentoxide ($TiO_5$) and tantalum pentoxide ($Ta_2O_5$), the low refractive index layer is made of a material selected from the group consisting of silicon dioxide ($SiO_2$) and aluminum oxide ($Al_2O_3$).

3. The optical filter as claimed in claim 1, further comprising an and-reflective film disposed on the substrate opposite to the film stack.

4. The optical filter as claimed in claim 3, wherein the and-reflective film is comprised of a plurality of high refractive index layers and a plurality of low refractive layers alternately stacked one on another.

5. The optical filter as claimed in claim 4, wherein the anti-reflective film is composed of two $Ti_3O_5$ layers and two $SiO_2$ layers.

6. The optical filter as claimed in claim 5, wherein respective thickness coefficients of the two $Ti_3O_5$ layers are 0.301 and 2.546, and the respective thickness coefficients of the two $SiO_2$ layers are 0.421 and 1.137.

7. An optical filter for screening out infrared and ultraviolet light, comprising:
   a transparent substrate, and a film stack formed on the substrate, the film stack comprising a plurality of high refractive index layers and a plurality of low refractive index layers alternately stacked one on another, the high refractive index layer is made of $TiO_2$, the low refractive index layer is made of $SiO_2$, the film stack being represented as follows: $(a_1Ha_2L)^7(b_1Hb_2L)^7(c_1Hc_2L)^6(d_1Hd_2L)^6$ wherein H represents a high refractive index layer having a base optical thickness equal to one fourth of a reference wavelength associated with the optical filter, L represents a low refractive index layer having a base optical thickness equal to one fourth of said reference wavelength associated with the optical filter, $a_1$ is in the range from 3.169 to 3.721, $a_2$ is in the range from 2.904 to 3342, $b_1$ is in the range from 2.519 to 2.804, $b_2$ is in the range from 2.472 to 2.982, $c_1$ is in the range from 0.799 to 0.998, $c_2$ is in the range from 0.665 to 1.185, $d_1$ is in the range from 0.246 to 1.004, $d_2$ is in the range from 0.594 to 1.221, the expression enclosed in each parenthesis represents a filter cavity, and the superscript represents the number of repetition of the expression enclosed in that parenthesis.

8. The optical filter as claimed in claim 7, further comprising an anti-reflective film disposed on the substrate opposite to the film stack.

9. The optical filter as claimed in claim 8, wherein the anti-reflective film is comprised of a plurality of high refractive index layers and a plurality of low refractive layers alternately stacked one on another.

10. The optical filter as claimed in claim 9, wherein the anti-reflective film is composed of two $Ti_3O_5$ layers and two $SiO_2$ layers.

11. The optical filter as claimed in claim 10, wherein respective thickness coefficients of the two $Ti_3O_5$ layers are 0.301 and 2.546, and the respective thickness coefficients of the two $SiO_2$ layers are 0.421 and 1.137.

* * * * *